US006921988B2

United States Patent
Moree (12) United States Patent
(10) Patent No.: US 6,921,988 B2
(45) Date of Patent: Jul. 26, 2005

(54) ANTI-SPOOFING ELASTOMER MEMBRANE FOR SECURE ELECTRONIC MODULES

(75) Inventor: Pascal Moree, Voisins le Bretonneux (FR)

(73) Assignee: Thales e-Transactions S.A., Plaisir (FR)

( * ) Notice: Subject to any disclaimer, the term of this patent is extended or adjusted under 35 U.S.C. 154(b) by 239 days.

(21) Appl. No.: 10/221,787

(22) PCT Filed: Mar. 9, 2001

(86) PCT No.: PCT/FR01/00712

§ 371 (c)(1), (2), (4) Date: Sep. 17, 2002

(87) PCT Pub. No.: WO01/69560

PCT Pub. Date: Sep. 20, 2001

(65) Prior Publication Data

US 2003/0047433 A1 Mar. 13, 2003

(30) Foreign Application Priority Data

Mar. 17, 2000 (FR) .......................................... 00 03465

(51) Int. Cl.⁷ .............................................. H01H 35/00
(52) U.S. Cl. ........................ 307/119; 307/116; 307/328
(58) Field of Search ............................. 307/116, 119, 307/328

(56) References Cited

U.S. PATENT DOCUMENTS

| | | | | |
|---|---|---|---|---|
| 4,636,593 A | * | 1/1987 | Novak et al. ................. | 200/5 A |
| 4,884,710 A | * | 12/1989 | Kleine et al. ................ | 220/4.02 |
| 5,012,054 A | * | 4/1991 | Rada et al. ................... | 200/314 |
| 5,270,681 A | * | 12/1993 | Jack ............................ | 340/427 |
| 5,350,890 A | * | 9/1994 | Fairbrother et al. ......... | 200/5 A |
| 5,386,106 A | * | 1/1995 | Kumar ......................... | 235/380 |
| 5,499,012 A | * | 3/1996 | Tracy et al. .................. | 340/514 |
| 6,023,503 A | * | 2/2000 | Schneider et al. ........... | 379/188 |
| 6,396,924 B1 | * | 5/2002 | Suso et al. .............. | 379/433.13 |

FOREIGN PATENT DOCUMENTS

| | | |
|---|---|---|
| DE | 91 05 960 | 6/1992 |
| DE | 43 12 905 | 10/1994 |
| DE | 197 05 518 | 8/1998 |

* cited by examiner

Primary Examiner—Robert L. DeBeradinis
(74) Attorney, Agent, or Firm—Oblon, Spivak, McClelland, Maier & Neustadt, P.C.

(57) ABSTRACT

A tamper-proof elastomeric membrane device for secure electronic housings. At least one button is molded in this elastomeric membrane. The button is under pressure when the housing is closed to act on an electronic circuit, and the button is idle when the housing is open. The device can be applied to secure housings, such as in particular confidential code housings, whose physical integrity is sought to be guaranteed by a device for detecting opening.

18 Claims, 6 Drawing Sheets

SECTION A-A

ANTI-SPOOFING ELASTOMER MEMBRANE FOR SECURE ELECTRONIC MODULES

The present invention relates to a tamper-proof elastomeric membrane for secure electronic housings. It applies to secure housings, such as in particular confidential code housings, whose physical integrity it is sought to guarantee by a means for detecting opening.

Secure electronic housings are used in numerous applications and make it possible in particular to read chip cards such as for example bank cards, electronic purses, multiservice (telephone, bank, electronic purse, health, etc) cards or private payment cards. In order to avoid fraud, they are equipped with protection systems, such as tamper-proof devices, which guarantee their physical integrity.

Mention may be made of the example of electronic payment terminals (EPT), in particular those involving a bank card. These electronic terminals are targeted by crooks who attempt by any means to open them and to modify them for fraudulent use. In response, bank card organizations, such as Visa International, impose severe security standards in respect of the licensing of these payment terminals. According to one of these standards, the terminals must be able to detect any attempt to open their housing. The detection of opening causes in particular the disabling of the security module, which contains for example a collection of cryptographic algorithms and of secret codes serving to validate the chip card or magnetic swipe card and to ensure the integrity of the payment information (counters of units or transactions).

Electronic payment terminals involving a bank card sometimes comprise confidential code housings, also referred to as Pinpads. These housings serve to read a bank card, to enter its secret code and to verify the validity of the code entered. They generally comprise a numerical keypad, a liquid crystal screen, a chip card reader, possibly a code mask and a wire connection to a point of sale terminal. In this example, the electronic payment terminal is the assembly consisting of the confidential code housing and of the point of sale terminal.

In the current art, electronic payment terminals are equipped with switches which detect opening. These switches are generally installed under the lid of the housing, and are connected to a printed circuit containing the security module. The opening of the lid causes the opening of the switches, thereby invalidating or destroying the security module. The number of these switches varies depending on the reliability required, a large number corresponding to better reliability.

A drawback of this art is the cost: these switches are expensive components, and their numbers are increasing on account of ever stricter security standards.

Another drawback is the lack of reliability of these switches, in particular false detections. The latter often occur in the event of a shock, in particular when the housing falls. The housing deforms and comes apart locally, at the level of one or more switches, for a fraction of a second. This is especially detrimental for its owner who can then no longer use it. In order to limit these false detections, the switches may be equipped with springs intended to absorb shocks and vibrations, but this further increases the cost of the confidential code housing. Another solution consists in filtering the detections of duration lower than a few fractions of a second through an electronic filter, but this decreases the sensitivity and consequently the reliability of the tamper-proof system.

Another solution, taught in the documents DE-A-4312905 and DE-U-9105960, consists in wrapping the electronic components which one seeks to protect in a film covered with conducting tracks, these conducting tracks being parallel to one another and forming meander lines, any tampering being detected by the breaking of one of these tracks.

An aim of the invention is to alleviate the aforesaid drawbacks, and in particular to reduce the costs of production of electronic payment terminals.

To this end, the invention relates to a tamper-proof device for secure electronic housing (20) which detects any attempt to open the housing. The device comprises an elastomeric membrane (50) in which is molded at least one button (51); the button being under pressure when the housing is closed so as to act on an electronic circuit (60), the button being idle when the housing is open.

The main advantages of the invention are that it is more reliable than the already-known tamper-proof devices, that it is easy to assemble, and that it makes it possible to install a large number of buttons, and advantageously in a random manner without any significant extra cost as compared with the known systems.

Other characteristics and advantages of the invention will become more clearly apparent in the description which follows and in the appended drawings which represent.

Reference is firstly made to FIGS. 1*a*, 1*b*, 1*c*, 1*d*, 1*e* and 1*f* which represent examples of possible applications of the invention.

Figure 1A:
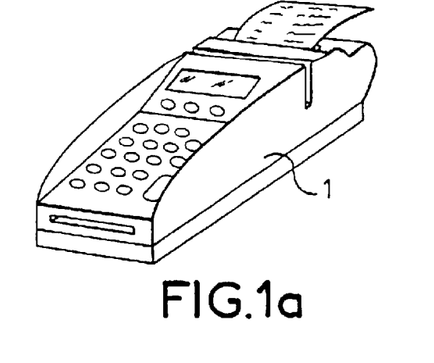
FIG. 1*a*, an exemplary use of the invention in a standalone electronic payment terminal.

FIG. 1*a* represents an electronic payment terminal 1, which serves to make payments by bank card in particular at trader's premises. Terminals of this type are also called point of sale terminals (PST) on account of their use. This terminal operates in a standalone manner; it is not linked to a cash till. It comprises in particular: a keypad, enabling the trader to input the amount of the transaction, and enabling the customer to input his secret code; a display, for transmitting messages to the trader or to the customer; a thermal printer for issuing receipts; a chip card reader; a radio link with a modem; a memory containing for example a log of the operations, the transactions recorded and a black list. This apparatus must be made secure so as to avoid the risks of fraud, in particular those related to the reading of secret data contained in this terminal. It therefore contains a physical security device which makes it possible to detect any attempt to open the housing.

Figure 1B:
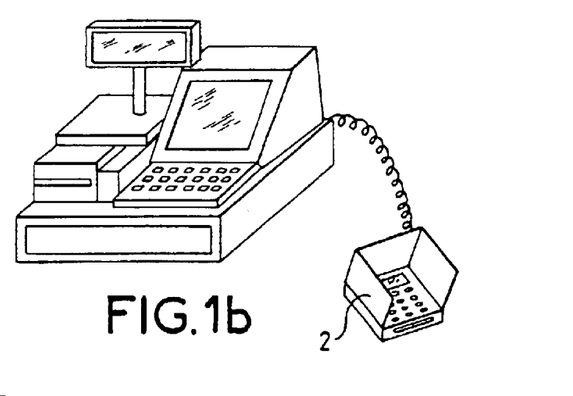
FIG. 1*b*, an exemplary use of the invention in a confidential code housing linked to a cash till.

FIG. 1b represents a confidential code housing 2, linked to a cash till. This housing serves for inputting the secret code of a bank card, and for verifying the validity of the code entered. It generally comprises a wire link to the cash till, a code mask which hides the keypad from prying eyes, a display, a keypad, and a chip card reader. This confidential code housing is used by the customer only, and does not print a receipt. The inputting of the amount of the transaction and the printing of the receipt are performed on the cash till. One risk of fraud is the interception of the secret code of the bank card. Fraudsters modify the confidential code housing so as to add a reading device under the keypad, which transmits the sequence of keys pressed by the customer, that is to say the secret code. In order to counter this type of fraud, confidential code housings are made secure, and are able to detect any attempted opening.

Figure 1C:
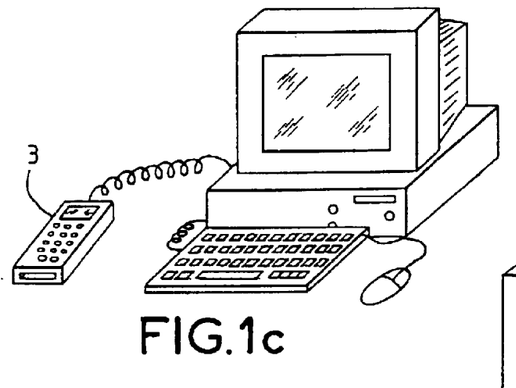
FIG. 1*c*, an exemplary use of the invention in secure reader serving as a peripheral for a computer.

FIG. 1c represents a secure reader serving as a peripheral for a computer. This reader makes it possible to read chip cards, this possibly serving for example in making secure electronic payments by bank card over the Internet, in identifying the bearer of a chip card so as to authorize access to data contained in the computer, or in reading or writing data from or to a private chip card. In the application to secure payment over the Internet, this reader has at least two advantages: security and confidentiality. Security and confidentiality result from the fact that no data item relating to the bank card, such as the secret code, the date of expiry, the name of the card owner, travels unencrypted over the network. Fraud is possible as soon as this reader is modified, which is why it must be made secure and in particular be capable of detecting any attempt to open the housing.

Figure 1D:
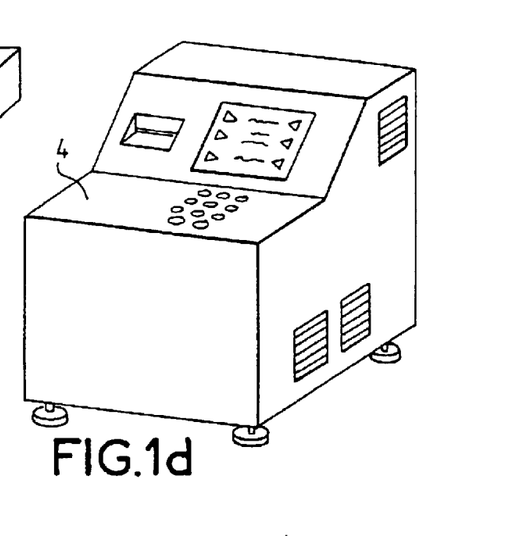
FIG. 1*d*, an exemplary use of the invention in a ticket dispenser.

FIG. 1d represents an automatic ticket dispenser 4. We shall not recall the principle of operation here nor its constituent elements. It must obviously be protected against any attempt to open the lid, so as in particular to invalidate the security module.

Figure 1E:
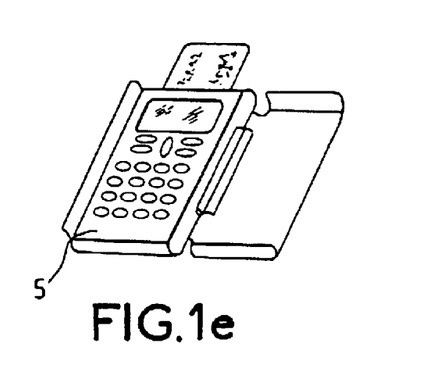
FIG. 1*e*, an exemplary use of the invention in an electronic purse reader.

FIG. 1e represents a chip card secure reader 5, which may for example be an electronic purse reader. This apparatus comprises a physical protection, which makes it possible in particular to detect any attempt to open the housing so as to avoid for example the production of false electronic money.

Figure 1F:
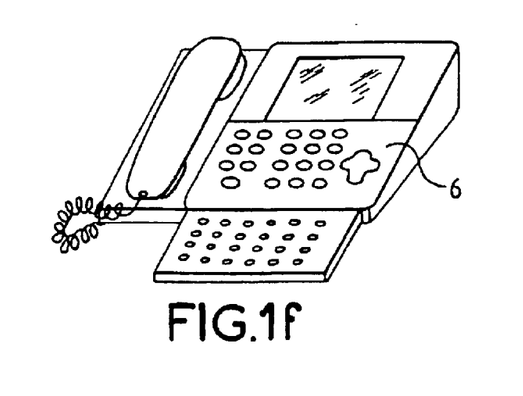
FIG. 1*f*, an exemplary use of the invention in a communication terminal.

FIG. 1f represents a secure communication terminal 6. This terminal may for example be a telephone offering real-time video services as well as Internet access, advantageously comprising a chip card reader making it possible to access a secure portal. This terminal contains confidential data, such as for example encryption keys or private data stored in memory. It is equipped with a system which makes it possible to detect any attempt to open the housing, and which causes the destruction of the confidential data.

A common characteristic of the apparatuses described hereinabove, is that they must be able to detect any attempt to open their housing or a lid so as to ensure the integrity or the confidentiality of their contents.

Figure 2:
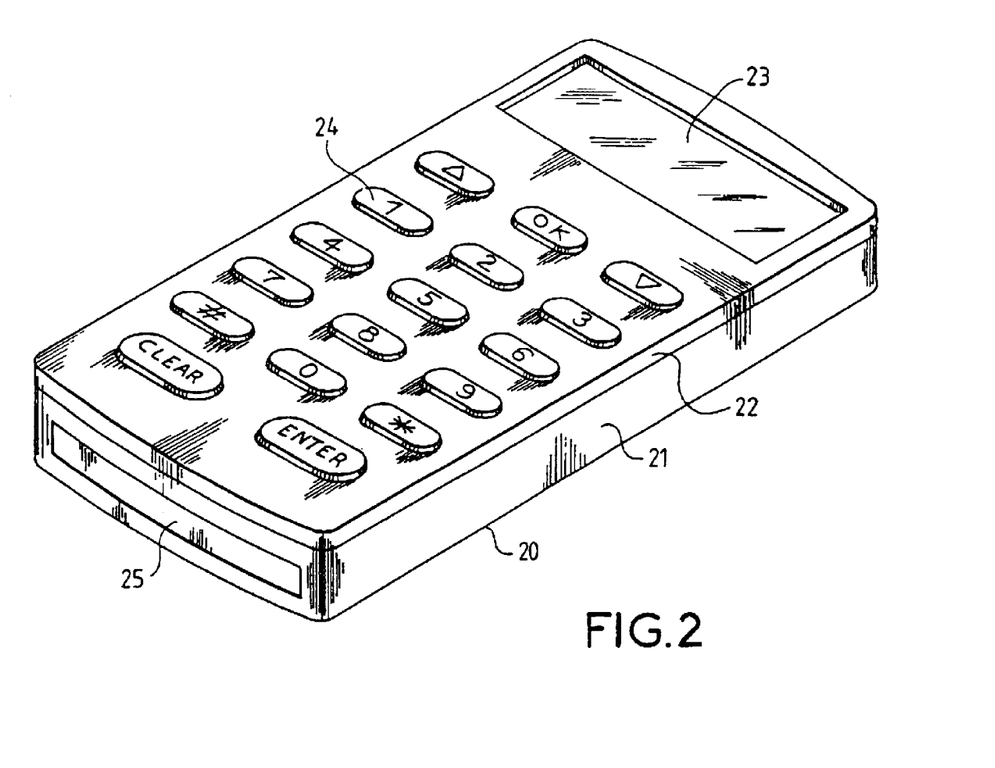
FIG. 2, a confidential code housing.
Figure 3A:
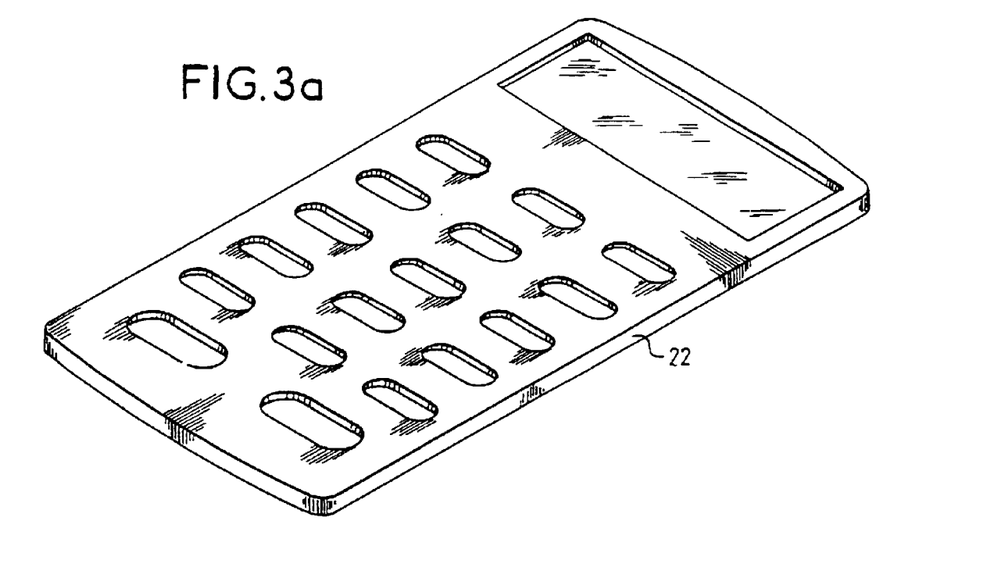
FIGS. 3*a* and 3*b*, the lid and the base of the confidential code housing represented in FIG. 2.
Figure 3B:
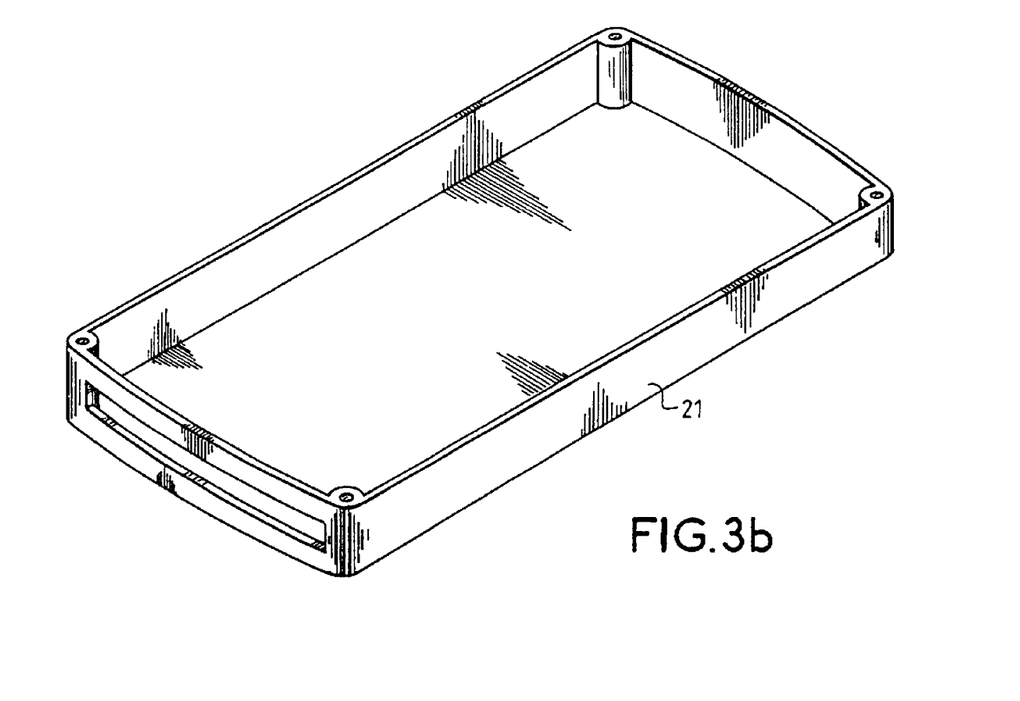

In the description which follows, we shall illustrate an example of the prior art and an application of the invention in a confidential code housing. Reference is made to FIG. 2 in which is represented a confidential code housing 20, comprising in particular a housing body 21, a housing lid 22, a display 23, a keypad 24, a chip card reader 25. FIG. 3a represents the lid of the housing alone, and FIG. 3b represents the body of the housing 21.

Figure 4A:
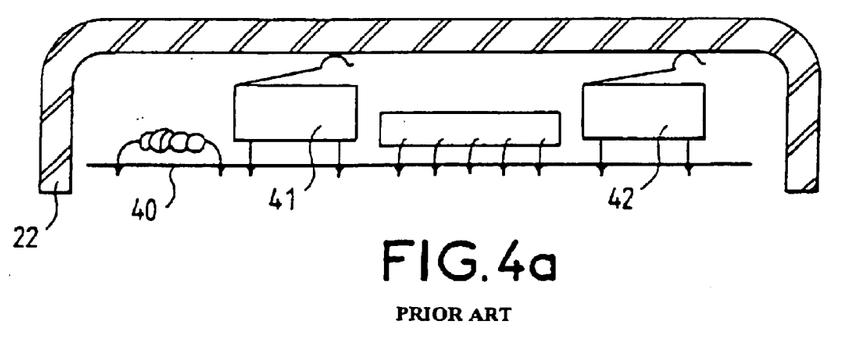
FIGS. 4*a* and 4*b*, an exemplary tamper-proof device according to the prior art.
Figure 4B:
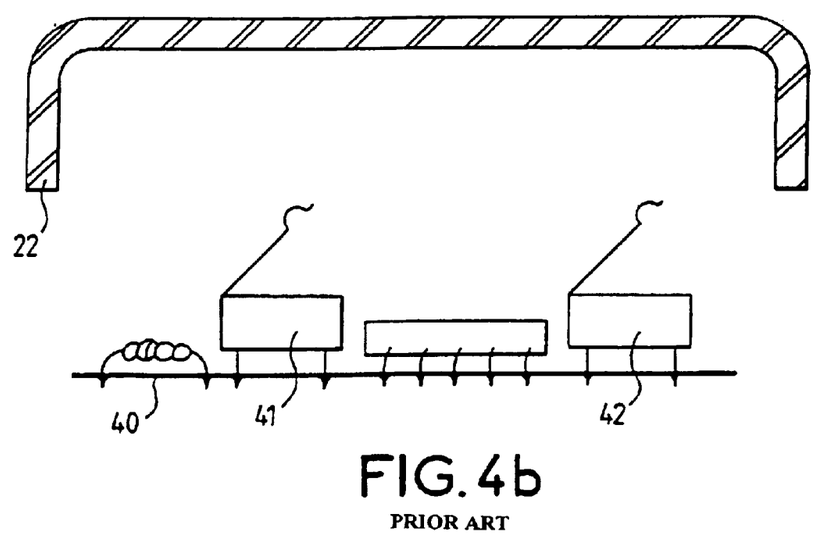

Reference is now made to FIGS. 4a and 4b to describe an exemplary embodiment of a tamper-proof device according to the known techniques. These figures represent a sectional view of an electronic circuit 40, and of a housing lid 22. The lid 22 belongs to the housing 20 represented in FIG. 2. Two electronic switches 41 and 42 are installed on the electronic circuit 40. When the housing 20 is closed as represented in FIG. 4a, its lid 22 rests on the switches 41 and 42, this having the effect of closing them. If anyone attempts to open the housing, the lid 22 no longer rests on the switches, thereby opening them as represented in FIG. 4b. Any attempted tampering is thus detected by the circuit linked to each switch, this having the effect of invalidating the security module.

A drawback of this art is its cost: the switches are expensive components which are complex to assemble, and their numbers are increasing on account of ever stricter security standards.

Another drawback is the lack of reliability of these switches, in particular false detections. The latter often occur in the event of a shock, in particular when the housing falls. The housing deforms and comes apart locally, at the level of one or more switches, for a fraction of a second. This is especially detrimental for its owner who can then no longer use it. In order to limit these false detections, the switches may be equipped with springs intended to absorb shocks and vibrations, but this further increases the cost of the confidential code housing. Another solution consists in filtering the detections of duration lower than a few fractions of a second through an electronic filter, but this decreases the sensitivity and consequently the reliability of the tamper-proof system.

Figure 5A:
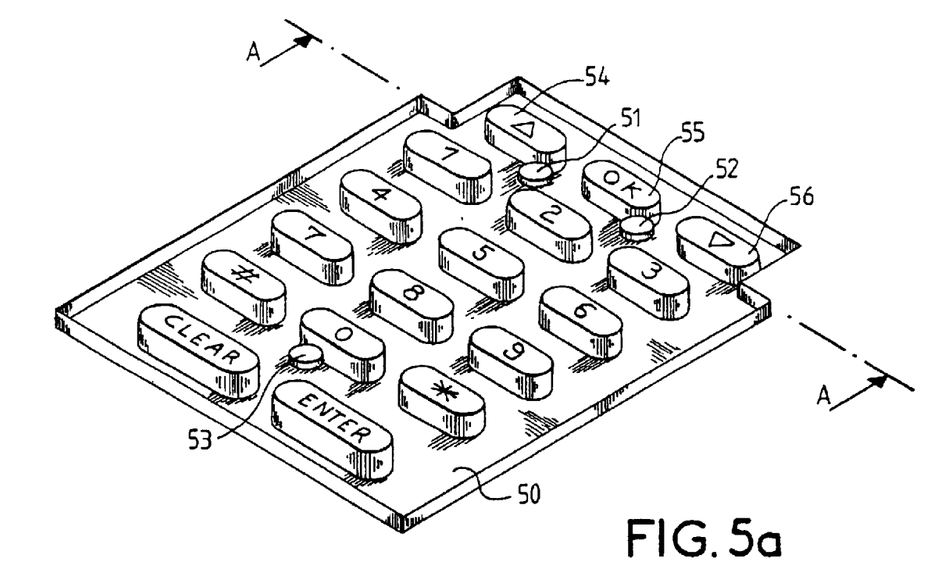
FIG. 5*a*, an exemplary tamper-proof elastomeric membrane according to the invention.
Figure 5B:
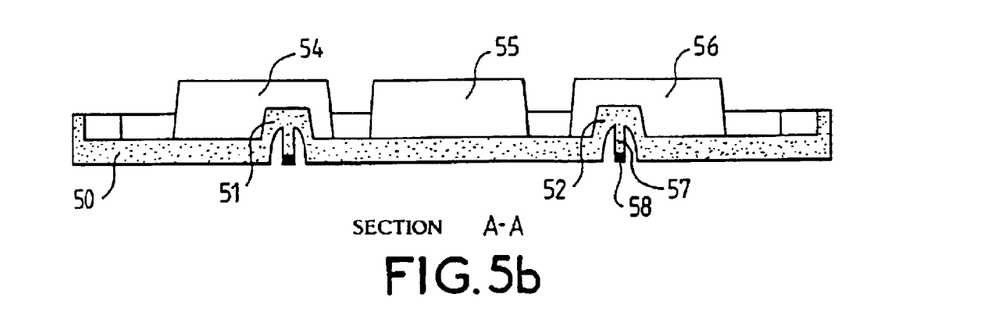
FIG. 5*b*, a sectional view of the membrane represented in FIG. 5*a*.

Reference is now made to FIGS. 5a and 5b which represent an exemplary embodiment of a tamper-proof elastomeric membrane according to the invention. This membrane 50, made of elastomeric material such as silicone, belongs to the keypad 24 of the confidential code housing 20 represented in FIG. 2. It contains the buttons of the keys of the keypad 24, such as for example the buttons 54, 55, 56. It also contains three buttons 51, 52, 53, which are roughly for example not as tall as the keypad key buttons. The buttons molded in the membrane are covered by a conducting substrate such as represented in the sectional view of FIG. 5b: for example the button 52 comprises a lug 57 extended by a part made of carbon 58.

Figure 6A:
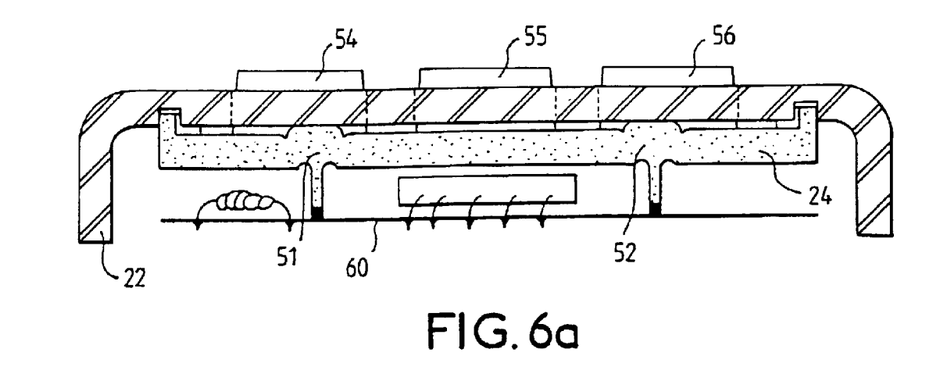
FIGS. 6*a* and 6*b*, an exemplary tamper-proof device according to the invention.
Figure 6B:
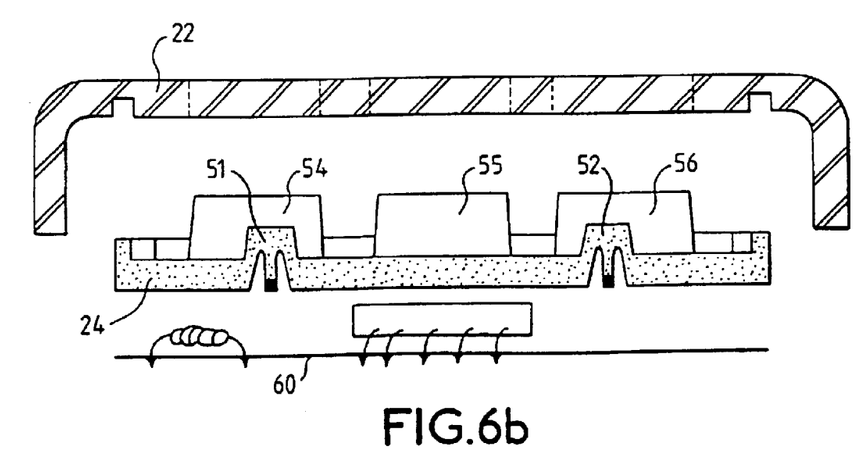

Reference is also made to FIGS. 6a and 6b which represent this membrane viewed in section with other elements. The membrane is installed under the lid 22 of the housing 20 represented in FIGS. 2 and 3a. An electronic circuit 60, making it possible in particular to detect the pressed keys of the keypad, is installed under the membrane. When the housing is closed as represented in FIGS. 6a, the lid 22 rests on the buttons 51, 52, 53. These buttons are depressed under the pressure exerted by the lid 22 with respect to their idle position. The conducting part of the buttons is consequently in contact with the electronic circuit 60. These conducting contact points make it possible to link together conducting tracks of the circuit 60. Thus, the buttons 51, 52 and 53 establish electrical links in the circuit 60 while the housing is closed. When the housing is open as represented in FIG. 6b, the lid 22 no longer rests on the buttons 51, 52, 53. These buttons are then in their idle position and are no longer in contact with the electronic circuit 60. They operate in the manner of switches which make it possible to detect any attempt to open the housing.

An advantage of the invention as compared with the prior art is the saving in the components. When buttons are added, the price of the membrane is not changed since it is sufficient to modify the manufacturing mold and to add the same conducting substrate as on the keypad keys. This is to be compared for example with switches, whose addition increases the cost of the tamper-proof device at least by the price of the switches. The cost incurred through the addition of switches is saved by virtue of the invention. The tamper-proof device can therefore be rendered more reliable by adding buttons, without thereby increasing its cost.

Another advantage of the invention is the reliability of the tamper-proof device. Specifically, the membrane's elasticity properties avoid false detections incurred in particular through shocks. The membrane thus advantageously replaces the mechanical or electronic filters which could decrease the sensitivity of the tamper-proof device.

Another advantage of the invention is its ease of assembly. The membrane is simply laid in order to be installed in place. It requires no soldering or other mechanical intervention to bind it to the other components present in the housing. Consequently, the assembly times are reduced as compared with the known techniques using switches, thereby contributing to the additional reduction in cost.

According to an advantageous variant, the buttons serving to detect the opening of the housing may be distributed randomly over the surface of the membrane. Thus, fraudsters will not be able to pinpoint the location of the tamper-proof devices on a housing so as to foil the security system of another housing of the same model. For this purpose it is sufficient to make provision for several membrane manufacturing molds with different distributions of these buttons. The electronic circuits will themselves also be manufactured with conducting tracks whose positions depend on these buttons. As compared with tamper-proof devices based on electronic switches, this solution has the advantage of being easily achievable on an assembly line, and hence of lower cost.

Of course, the present invention is not limited to the embodiment described hereinabove by way of example. It extends to other variants.

It will thus be understood that the membrane has been described with three buttons serving to detect the opening of the housing, but that the invention applies also to any membrane comprising some other number of buttons. This number may be bigger or smaller depending for example on the level of security required or the size of the elastomeric membrane.

Furthermore, the membrane on which the buttons are installed is not necessarily a keypad membrane. In particular, this membrane may contain only buttons serving to detect the opening of the housing and no other type of button. It may for example contain just one button, or a very large number of buttons. Such a variant embodiment makes it possible in particular advantageously to replace a device containing a very large number of electronic switches serving to detect the opening of the housing.

In the foregoing description, the lid rests on the membrane, but the tamper-proof device according to the invention operates equally well if a mechanical member other than the lid rests on the membrane. The membrane may for example be installed under another component contained in the housing, such as for example a second electronic circuit. The first electronic circuit installed under the membrane contains the processing means on which the aforesaid buttons act; the second electronic circuit installed on the membrane places the buttons under pressure when the housing is closed.

The invention applies of course to any type of secure electronic housing. In general, it applies to secure housings whose physical integrity one seeks to guarantee by a means for detecting opening.

What is claimed is:

1. A tamper-proof device for a secure electronic housing configured to detect an attempt to open the housing, the housing including an electronic circuit, said device comprising:
    an elastomeric membrane comprising keypad buttons; and
    at least one button molded in the elastomeric membrane, wherein the at least one button is under pressure when the housing is closed to contact said electronic circuit, and the at least one button does not contact the electronic circuit when the housing is open.

2. The tamper-proof device as claimed in claim 1, wherein an action between the at least one button and the electronic circuit is effected by electrical contact between a conducting part belonging to the at least one button and conducting tracks belonging to the circuit.

3. The tamper-proof device as claimed in claim 1, wherein the elastomeric membrane is placed in contact with at least one mechanical element acting on the at least one button for detecting opening when the housing is closed, and no longer acting on top when the housing is open.

4. The tamper-proof device as claimed in claim 1, wherein the elastomeric membrane is placed between a lid and the electronic circuit.

5. The tamper-proof device as claimed in claim 1, wherein the secure electronic housing is a confidential code housing.

6. The tamper-proof device as claimed in claim 1, wherein the secure electronic housing is an electronic payment terminal.

7. The tamper-proof device as claimed in claim 1, wherein the secure electronic housing is electronic purse reader.

8. The tamper-proof device as claimed in claim 1, wherein the secure electronic housing is a communication terminal.

9. The tamper-proof device as claimed in claim 1, wherein the secure electronic housing is a communication terminal including a chip card reader.

10. The device of claim 1, the elastomeric membrane including a top surface and a bottom surface, and the at least one button including a first portion and a second portion, the first portion configured to extend above the top surface in a first state, and the second portion configured to extend below an entirety of the bottom surface and to contact the electronic circuit in a second state.

11. An electronic device configured to detect an attempt to open a housing including an electronic circuit, the device comprising:
    a membrane including an elastomeric material, the membrane comprising keypad buttons and including at least one button configured to contact the electronic circuit when the housing is closed and configured to not contact the electronic circuit when the housing is open.

12. The device of claim 11, the at least one button including a conductive portion adapted to contact conducting tracks of the electronic circuit, wherein an action between the at least one button and the electronic circuit is effected by electrical contact between the conductive portion and the conducting tracks.

13. The device of claim 11, the membrane contacting at least one mechanical element, the at least one mechanical element configured to apply pressure to the at least one button when the housing is closed and configured to not apply pressure to the at least one button when the housing is open.

14. The device of claim 11, the membrane including a top surface and a bottom surface, and the at least one button including a first portion and a second portion, the first portion configured to extend above the top surface in a first state, and the second portion configured to extend below an entirety of the bottom surface and to contact the electronic circuit in a second state.

15. An electronic device configured to detect an attempt to open a housing including an electronic circuit, the device comprising:
a membrane including an elastomeric material, the membrane including keypad key buttons and means for actuating, the means for actuating contacting the electronic circuit when the housing is closed and not contacting the electronic circuit when the housing is open.

16. The device of claim 15, the means for actuating including means for conducting, the means for conducting contacting conducting tracks of the electronic circuit, wherein an action between the conductive means and the electronic circuit is effected by electrical contact between the conductive means and the conducting tracks.

17. The device of claim 15, the membrane contacting at least one mechanical element, the at least one mechanical element configured to apply pressure to the means for actuating when the housing is closed, configured to not apply pressure to the means for actuating when the housing is open.

18. The device of claim 15, the membrane including a top surface and a bottom surface, and the means for actuating including a first means for deforming and a second means for deforming, the first means for deforming receiving a deforming pressure in a first state, and the second means for deforming extending beyond an entirety of the bottom surface to contact the electronic circuit in a second state.

* * * * *